Sept. 19, 1933.     H. G. MUELLER     1,927,526
EXHAUST VALVE MECHANISM
Filed Dec. 7, 1927     2 Sheets-Sheet 1
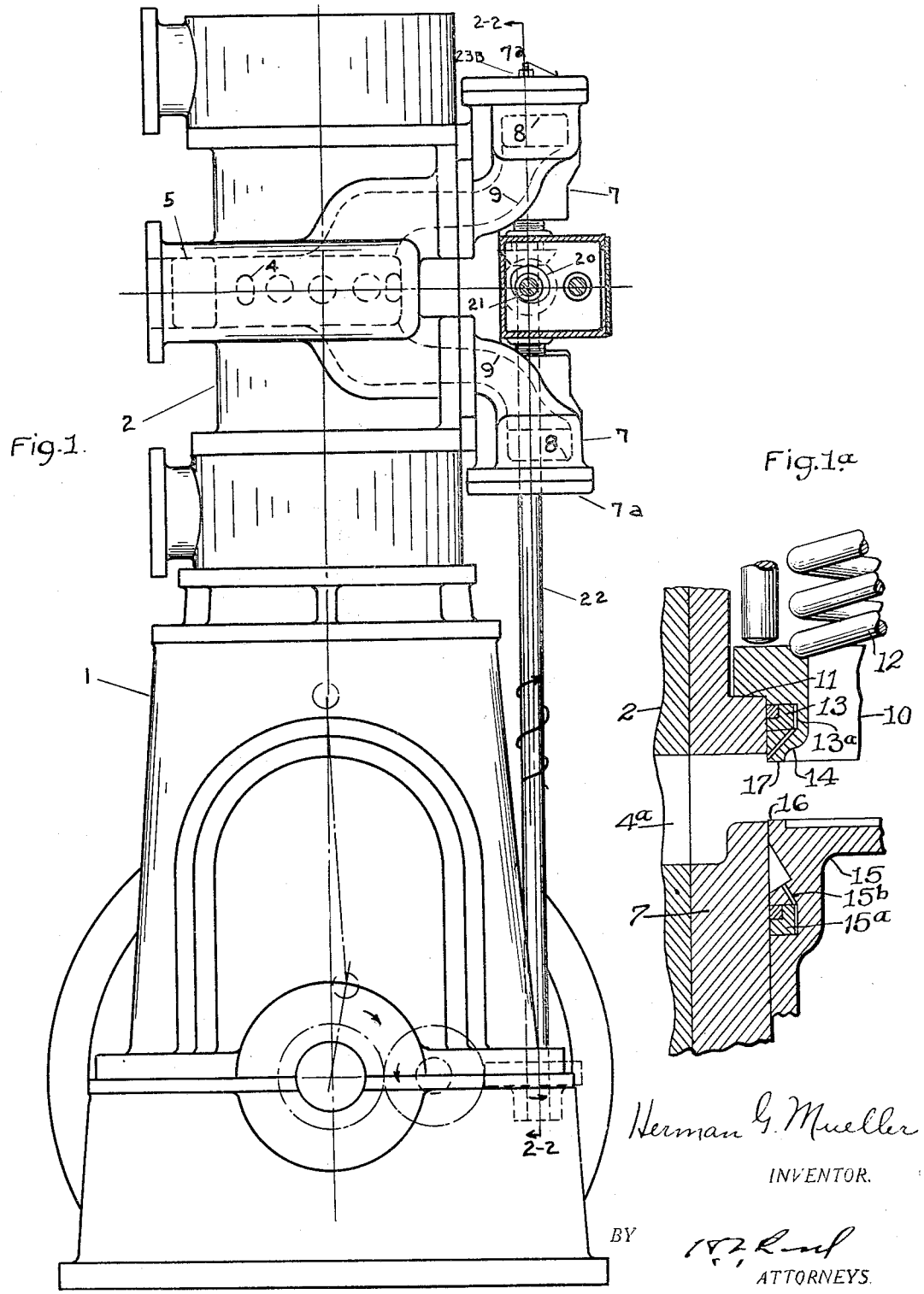
Herman G. Mueller
INVENTOR.
BY
ATTORNEYS

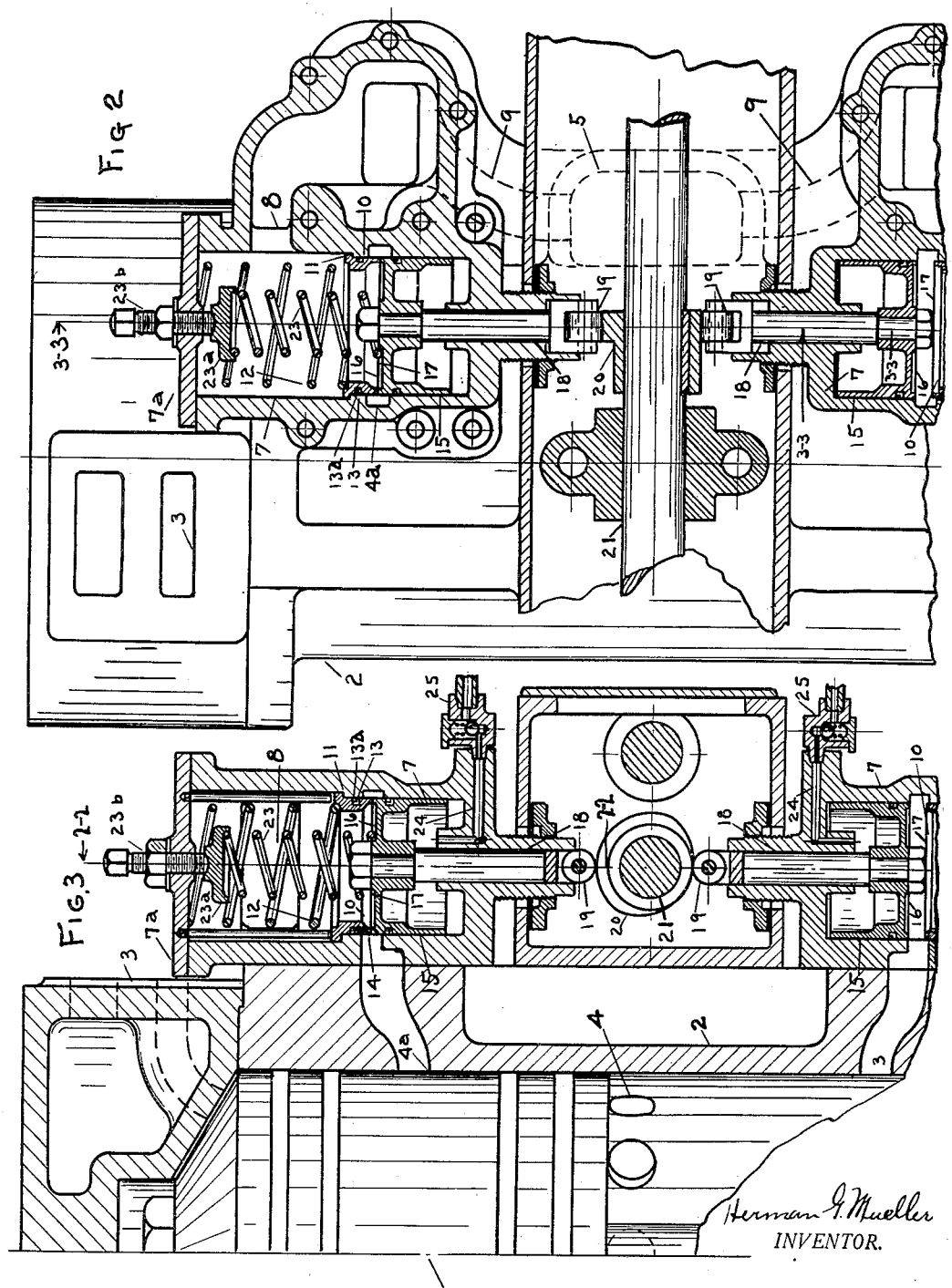

Patented Sept. 19, 1933

1,927,526

UNITED STATES PATENT OFFICE 1,927,526

EXHAUST VALVE MECHANISM

Herman G. Mueller, Erie, Pa., assignor to Skinner Engine Company, Erie, Pa., a corporation of Pennsylvania Application December 7, 1927. Serial No. 238,437

3 Claims. (Cl. 121—125)

This invention is designed to improve and simplify exhaust valve mechanisms and in some of its aspects is of general application and in a limited sense it is peculiarly designed for an auxiliary exhaust in connection with central exhaust uniflow engines. The invention contemplates simplifying the exhaust mechanism generally and providing the same with a yielding seat and with a mechanism which automatically holds the valve in closed position when a uniflow engine is exhausting to a condenser. The invention also involves improved means for sealing the valve. Other features and details of the invention will appear more fully from the specification and claims.

A preferred embodiment of the invention is illustrated in the accompanying drawings as follows:—

Fig. 1 shows a side elevation of an engine.

Fig. 1a is an enlarged view showing the seating and sealing features of the valve in section on the line 3—3 in Fig. 2.

Fig. 2 a section on the line 2—2 in Figs. 1 and 3.

Fig. 3 a section on the line 3—3 in Fig. 2.

1 marks the engine frame, 2 the engine cylinder, 3 the inlet ports leading to the cylinder, 4 the central exhaust ports, 5 the exhaust passage to which the central exhaust ports lead, 6 an elongated piston of the uniflow type operating over the central exhaust ports, 4a the auxiliary exhaust ports, 7 the exhaust valve chest, 8 a discharge port from the exhaust valve chest, and 9 a passage leading from the port 8 to the general exhaust passage 5.

A yielding valve seat 10 is arranged in the chest 7. It has a shoulder 11 limiting its movement and is seated against the shoulder 11 by means of a spring 12. The seat is provided with a packing ring groove 13a in which is arranged a packing ring 13, the rear of the groove being connected by a passage 14 with the exhaust port 4a so that with steam pressure in the exhaust port there is steam in the groove 13a compressing the ring 13 outwardly into sealing position and with a release of pressure in the port 4a there is a release of pressure on the ring. An exhaust valve 15 has a seating face 16 operating on a seating face 17 of the seat 10. The exhaust valve has a stem 18 on the lower end of which is a cam roller 19 operating upon a cam 20. The cam 20 is mounted on a shaft 21 and the shaft 21 is driven through suitable gearing from a shaft 22, which shaft 22 in turn is driven by suitable gearing from the crank shaft of the engine as shown in dotted lines in Fig. 1. A spring 23 is arranged between a head 23a and the valve 15. The head 23 is made adjustable by a screw 23b extending through a head 7a of the valve chest.

The valve chest under the valve 15 is closed and is connected by a passage 24 with the atmosphere, said passage being provided with a spring-actuated check 25 preventing a return flow to the chest.

In operating the valve, the valve is positively closed by the cam operating on the stem, the valve raising the seat slightly to assure a closure with each operation. At this closure point the pressure is released in the auxiliary exhaust port so that the pressure is off the ring 13. As the cam passes from under the stem 18, the valve 15 is opened through the action of the spring 23. Here again also the pressure is released in the exhaust port 4a and there is a release of pressure on the ring permitting the seating of the seat 10 on the shoulder 11, the release of pressure in the exhaust port following the central exhaust. On the other hand, prior to the opening of the central exhaust by the action of the piston steam remains under pressure in the exhaust port forcing the closing ring into sealing relation with the walls of the valve chest. The exhausting of air from the valve chest under the valve 15 adds to the spring 23 in opening the valve in that it creates a sub-atmospheric condition under the valve as against atmospheric condition against which the ordinary exhaust operates. The valve makes a closure with the walls of the chest and is provided with the usual packing ring 15a and this packing ring is connected by a passage 15b with the wall of the valve so that when the valve is closed steam operates behind the ring to assure the closure. At the time of opening the valve, the exhaust pressure is very largely exhausted so that a comparatively light spring 23 may be used and in as much as this spring must be overcome when the condenser is operating in order that the valve 15 may remain closed, this is of importance in this respect. It is also of importance in that the lighter spring relieves the load on the cam in closing the valve and at the moment of closing the valve the ring 15a is not under pressure so that in this respect also the load on the cam is reduced.

When the engine exhausts to a condenser the sub-atmospheric condition created by the condenser communicating through the passages 5, 9 and port 8 reduces the pressure above the valve 15 to such an extent as to prevent the opening of the valve through the action of the spring 23 so that with this construction the auxiliary exhaust valve automatically remains closed when the engine is operating with the condenser. The spring 23 is adjusted through the screw 23b so as to give it the right strength to permit the valve to remain closed under the condensing condition. It will be understood that while a sub-atmospheric condition is created under the valve 15 by way of the check valve 25 the clearance under the valve is such that this reduction in pressure does not equal the reduction in pressure created by the condenser. Consequently it does not materially affect the maintenance of the closure when the condenser is operating.

It will be noted also that these exhaust valves under this construction are directly opposed and that the single operating cam, directly between them with the axis extending crosswise of the cylinder, actuates both valves. While I have shown but a single cylinder, it will be understood that this construction is not only particularly desirable for a single cylinder engine but is also advantageous in that it may be readily extended.

What I claim as new is:—

1. In an exhaust valve mechanism, the combination of a steam engine cylinder having an exhaust port; an exhaust valve chest communicating with the port; an exhaust valve seating in the chest; a cam closing the valve; a spring opening the valve; a vacuum chamber back of the valve; and a check-valved passage leading to the vacuum chamber behind the exhaust valve.

2. In an exhaust valve mechanism, the combination of a steam engine cylinder having a central exhaust port and an auxiliary exhaust port; an exhaust valve chest communicating with the auxiliary exhaust port; an exhaust valve seating in the chest; a cam closing the valve; a spring opening the valve; a vacuum chamber back of the valve; and a check-valved passage leading to the vacuum chamber behind the exhaust valve.

3. In an exhaust valve mechanism, the combination of a steam engine cylinder having an exhaust port; an exhaust valve chest communicating with the port; an exhaust valve seating in the chest; a cam closing the valve; a spring opening the valve; and a vacuum chamber back of the valve.

HERMAN G. MUELLER.